(12) United States Patent
Davies, Jr.

(10) Patent No.: US 9,592,898 B1
(45) Date of Patent: Mar. 14, 2017

(54) AIRFRAME

(71) Applicant: Allen L. Davies, Jr., Cape Coral, FL (US)

(72) Inventor: Allen L. Davies, Jr., Cape Coral, FL (US)

( * ) Notice: Subject to any disclaimer, the term of this patent is extended or adjusted under 35 U.S.C. 154(b) by 37 days.

(21) Appl. No.: 14/880,966

(22) Filed: Oct. 12, 2015

Related U.S. Application Data

(60) Provisional application No. 62/067,254, filed on Oct. 22, 2014.

(51) Int. Cl.
  *B64C 1/00* (2006.01)
  *B64C 1/06* (2006.01)
  *B64C 1/12* (2006.01)

(52) U.S. Cl.
  CPC ............. *B64C 1/061* (2013.01); *B64C 1/12* (2013.01)

(58) Field of Classification Search
  CPC ......... B64C 1/00; B64C 1/064; B64C 1/1061; B64C 1/06; F16B 12/02; Y10T 403/71; Y10T 403/7182; Y10T 403/7188
  USPC ......................................................... 244/119
  See application file for complete search history.

(56) References Cited

U.S. PATENT DOCUMENTS

| | | | |
|---|---|---|---|
| 1,311,205 A | 7/1919 | Belcher | |
| 2,382,835 A | 8/1945 | Walter | |
| 2,997,262 A | 8/1961 | Kirk | |
| 3,020,986 A | 2/1962 | Kirk | |
| 5,520,747 A | 5/1996 | Marks | |
| 6,293,496 B1* | 9/2001 | Moe | B64G 1/58 244/119 |
| 2006/0186291 A1* | 8/2006 | Conway | A47B 47/05 248/231.81 |
| 2009/0236473 A1* | 9/2009 | Rawdon | B64C 1/12 244/120 |
| 2010/0140405 A1 | 6/2010 | Capasso | |
| 2011/0114791 A1 | 5/2011 | Henry | |

* cited by examiner

*Primary Examiner* — Timothy D Collins
*Assistant Examiner* — Richard G Davis
(74) *Attorney, Agent, or Firm* — QuickPatents, LLC; Kevin Prince

(57) ABSTRACT

An aircraft fuselage panel system for an aircraft of the type having a tubular fuselage frame includes a plurality of generally U-shaped frame members are each adapted to receive a portion of the tubular fuselage frame therein. Each frame member includes a plurality of apertures therethrough. A plurality of metal tabs are fixed to the tubular fuselage frame and include at least one aperture therethrough axially aligned with one of the apertures of one of the frame members. A rigid panel is adapted for fixing between each metal tab and the frame members. Each panel has a plurality of apertures therethrough each axially aligned with one of the apertures of the metal tabs and the frame members. A plurality of mechanical fasteners are adapted for fixing the panel between each metal tab and one of the frame members. The panel and frame member are fixed to the fuselage frame thereby.

7 Claims, 3 Drawing Sheets

AIRFRAME

CROSS-REFERENCE TO RELATED APPLICATIONS

This application claims the benefit of U.S. Provisional Patent Application 62/067,254, filed on Oct. 22, 2014, and incorporated herein by reference.

STATEMENT REGARDING FEDERALLY SPONSORED RESEARCH AND DEVELOPMENT

Not Applicable.

FIELD OF THE INVENTION

This invention relates to airplane frames and fuselages, and more particularly to a light-weight panel attachment system for aircraft frames.

DISCUSSION OF RELATED ART

Light-frame aircraft, particularly those made with a aluminum tubular frame, require some type of web or panel to span the gaps between tubular members to decrease drag on the aircraft and to enclose the fuselage. Conventional riveted panels are not suitable for such a frame because the tubular frame members are difficult to locate under the panel and can be weakened with too many rivets fastened thereto. Fabric sheets between frame members, even those coated to increase their rigidity, are subject to relatively easy tearing and wear. Metallic panels welded to the frame provide suitable strength but are relatively heavy and are not easily replaced if damaged or worn.

U.S. Pat. No. 2,997,262 to Kirk et al. on Aug. 22, 1961 teaches a cellular core panel made of fiberglass or aluminum foil covered by a sheet metal skin. Such a panel is bolted or riveted to a plurality of corrugated frame struts, not peripheral frame members. Further, panels are bolted together at flanges to form a joint between the panels. Such a structure is not well suited for use on a light-weight aircraft with tubular frame members because it is still relatively heavy and requires bolting each panel to a plurality of frame strut members that do not exist on such light-weight aircraft. Similar drawbacks exist with the composite structural panel of U.S. Pat. No. 3,020,986 to Kirk et al. on Feb. 13, 1962.

Therefore, there is a need for a system that allows for rigid panels between frame members that are light-weight, strong, and easily replaced. Such a needed invention would adequately enclose the fuselage and yet provide for easy maintenance of the panels or systems behind the panels. The present invention accomplishes these objectives.

SUMMARY OF THE INVENTION

The present device is an aircraft fuselage panel system for an aircraft of the type having a tubular fuselage frame. A plurality of generally U-shaped frame members are each adapted to receive a portion of the tubular fuselage frame therein. Each frame member includes a plurality of apertures therethrough. In one embodiment, each frame member includes two opposing tapers at an open side thereof.

A plurality of metal tabs are fixed, preferably by welding, to the tubular fuselage frame and include at least one aperture therethrough axially aligned with one of the apertures of one of the frame members.

A rigid panel is adapted for fixing between each metal tab and the frame members. Each panel has a plurality of apertures therethrough each axially aligned with one of the apertures of the metal tabs and the frame members. Preferably each panel is made with an epoxy fiberglass honeycomb panel, or the like.

A plurality of mechanical fasteners are adapted for fixing the panel between each metal tab and one of the frame members. The panel and frame member are fixed to the fuselage frame thereby. In one embodiment, each mechanical fastener is a flat-headed cam-lock fastener of the type having a stud assembly, a grommet, a retaining ring, a stud retaining ring, and a receptacle, such that the stud assembly may be flush-mounted with the panel.

The present invention is a system that allows for rigid panels between frame members that are light-weight, strong, and easily replaced. The present system encloses the fuselage and yet provides for easy maintenance of the panels or systems behind the panels. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
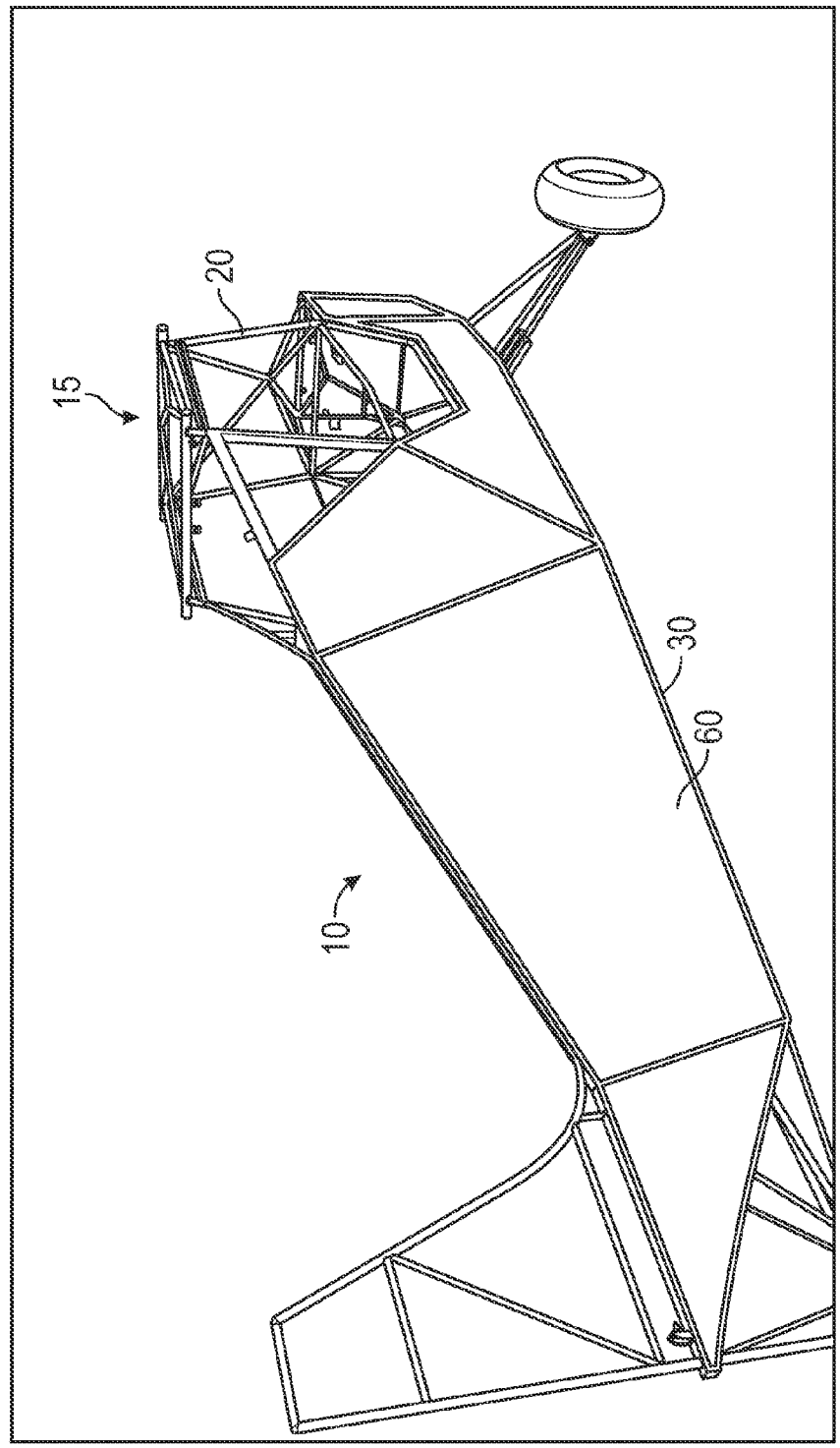
FIG. 1 is a perspective view of an aircraft fuselage panel system of the present invention.
Figure 2:
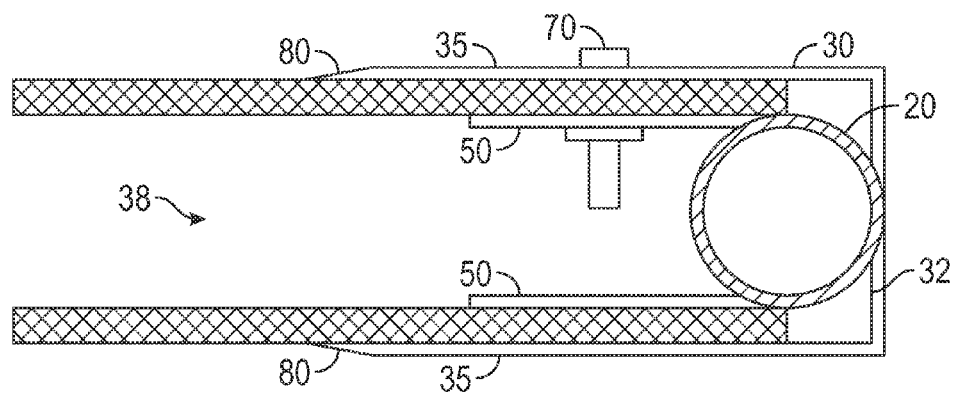
FIG. 2 is a cross-sectional view thereof through a tubular fuselage frame.
Figure 4:
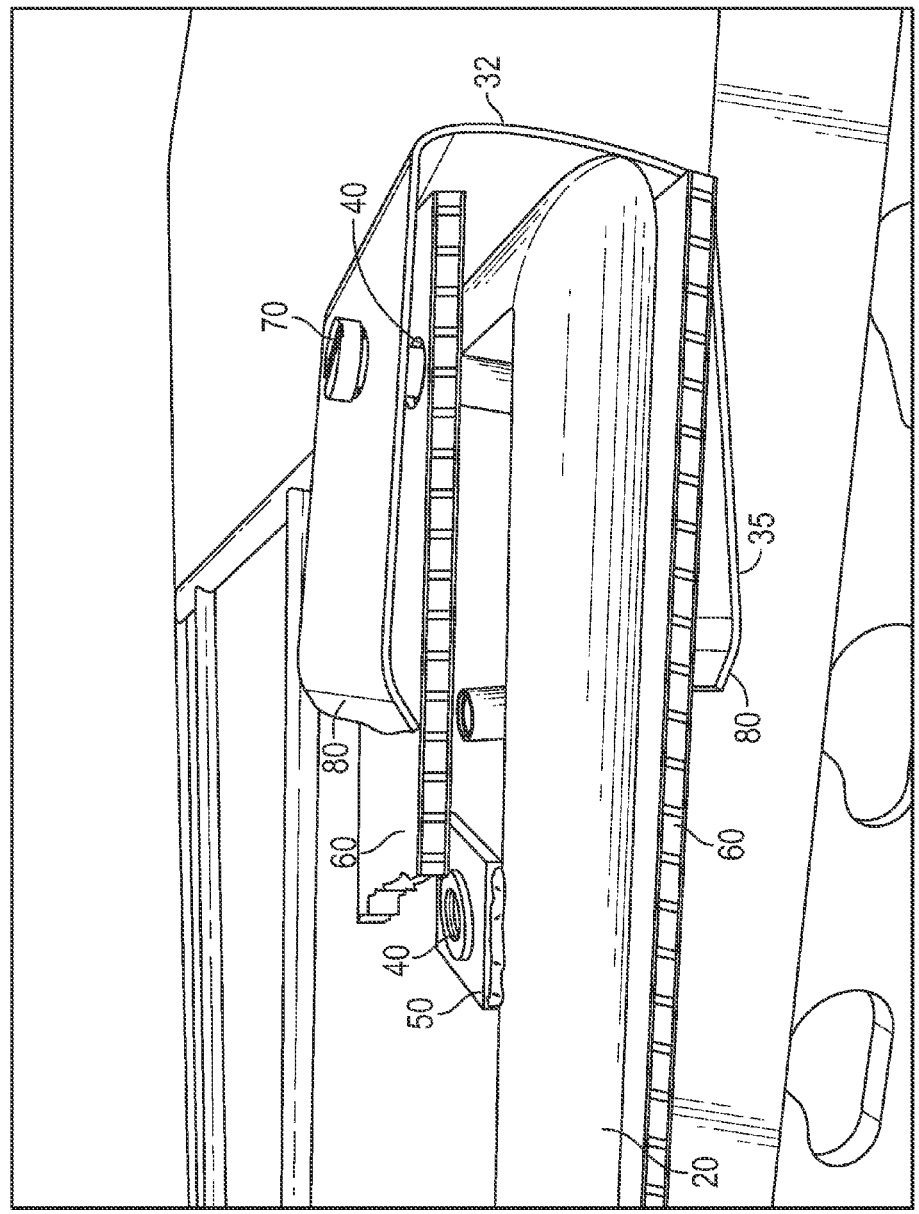
FIG. 4 is a perspective view thereof, partially cut-away for clarity of illustration.

FIGS. 1 and 2 illustrate an aircraft fuselage panel system 10 for an aircraft 15 of the type having a tubular fuselage frame 20. A plurality of generally U-shaped frame members 30 are each adapted to receive a portion of the tubular fuselage frame 20 therein. Each frame member 30 includes a plurality of apertures 40 therethrough. In one embodiment, each frame member 30 includes two opposing tapers 80 at an open side 38 thereof (FIGS. 2 and 4). In one embodiment, each frame member 30 includes two side portions 35 and a bottom portion 32, the apertures 40 in the frame members 30 being formed in at least one of the side portions 35.

A plurality of metal tabs 50 are fixed, preferably by welding, to the tubular fuselage frame 20 and include at least one aperture 40 therethrough axially aligned with one of the apertures 40 of one of the frame members 30.

A rigid panel 60 is adapted for fixing between each metal tab 50 and the frame members 30. Each panel 60 has a plurality of apertures 40 therethrough each axially aligned with one of the apertures 40 of the metal tabs 50 and the frame members 30. Preferably each panel 60 is made with an epoxy fiberglass honeycomb panel, such as those sold by Teklam Laminated Panels of Corona, Calif. as item number NE1G1-02-250, for example.

Figure 3:
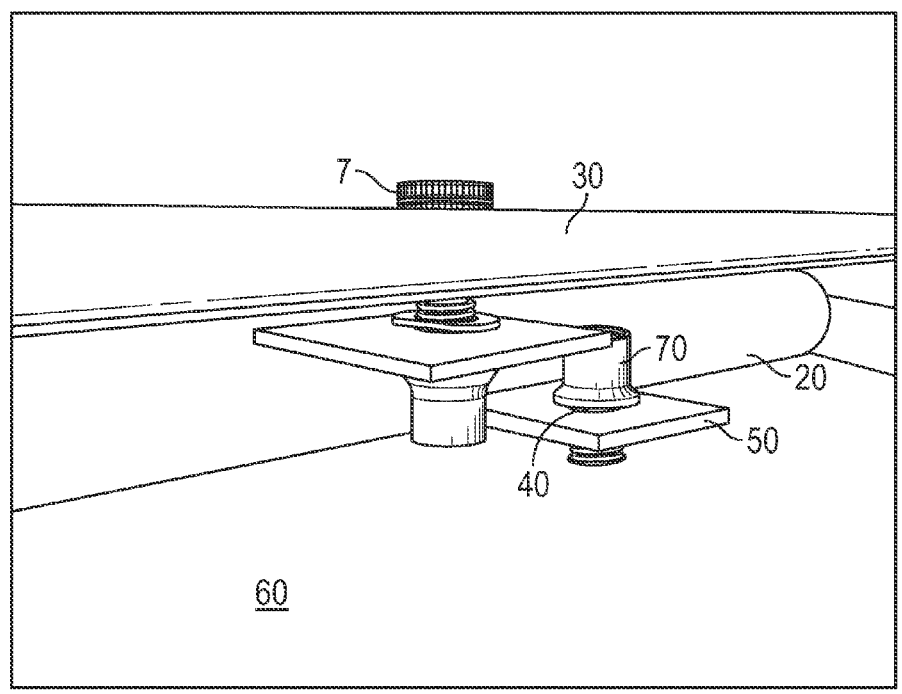
FIG. 3 is a perspective view of mechanical fasteners thereof.

A plurality of mechanical fasteners 70 (FIGS. 2 and 3) are adapted for fixing the panel 60 between each metal tab 50 and one of the frame members 30. The panel 60 and frame member 30 are fixed to the fuselage frame 20 thereby. In one embodiment, each mechanical fastener 70 is a flat-headed cam-lock fastener of the type having a stud assembly 71, a grommet 72, a retaining ring 73, a stud retaining ring 74, and a receptacle 75, such that the stud assembly 71 may be flush-mounted with the panel 60. Such flat-headed cam-lock fasteners are sold by Hanson Rivet & Supply Company of Pacoima, California under the model family "Camloc 4002 series fasteners."

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An aircraft fuselage panel system for an aircraft of the type having a tubular fuselage frame, the panel system comprising:
    a plurality of generally U-shaped frame members each adapted to receive a portion of the tubular fuselage frame therein and each including a plurality of apertures therethrough;
    a plurality of metal tabs fixed to the tubular fuselage frame and including at least one aperture therethrough axially aligned with one of the apertures of one of the frame members;
    a rigid panel adapted for fixing between each metal tab and the frame members and having a plurality of apertures therethrough each axially aligned with one of the apertures of the metal tabs and frame members; and
    a plurality of mechanical fasteners for fixing the panel between each metal tab and one of the frame members, the panel and frame members being fixed to the fuselage frame thereby.

2. The aircraft fuselage panel system of claim 1 wherein each frame member includes a two opposing tapers at an open side thereof.

3. The aircraft fuselage panel system of claim 1 wherein each frame member includes two side portions and a bottom portion, the apertures in the frame members being formed in at least one of the side portions.

4. The aircraft fuselage panel system of claim 1 wherein each of the metal tabs is fixed to the tubular fuselage frame by a metal welding method.

5. The aircraft fuselage panel system of claim 1 wherein each rigid panel is an epoxy fiberglass honeycomb panel.

6. The aircraft fuselage panel system of claim 1 wherein the plurality of mechanical fasteners include a flat-headed cam-lock fastener.

7. The aircraft fuselage panel system of claim 6 wherein the flat-headed cam-lock fastener is of the type including a stud assembly, a grommet, a retaining ring, a stud retaining ring, and a receptacle, whereby the stud assembly may be flush-mounted with the panel.

* * * * *